United States Patent
Cao et al.

(10) Patent No.: US 11,512,730 B2
(45) Date of Patent: Nov. 29, 2022

(54) STUD ASSEMBLY FOR HIGH CURRENT APPLICATIONS

(71) Applicant: GM Cruise Holdings LLC, San Francisco, CA (US)

(72) Inventors: Robert Cao, San Francisco, CA (US); Brian Schlotterbeck, San Francisco, CA (US); Adli Nureddin, Kentfield, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 281 days.

(21) Appl. No.: 16/875,228

(22) Filed: May 15, 2020

(65) Prior Publication Data

US 2021/0355982 A1 Nov. 18, 2021

(51) Int. Cl.
- *H01R 4/30* (2006.01)
- *F16B 33/00* (2006.01)
- *F16J 15/02* (2006.01)
- *H01R 11/12* (2006.01)
- *H01R 13/03* (2006.01)

(52) U.S. Cl.
CPC .......... *F16B 33/004* (2013.01); *F16J 15/022* (2013.01); *H01R 11/12* (2013.01); *H01R 13/03* (2013.01); *H01R 2201/26* (2013.01)

(58) Field of Classification Search
CPC .... F16B 33/004; F16B 5/0208; F16B 5/0266; F16B 41/002; F16J 15/022; H01R 11/12; H01R 11/283; H01R 11/285; H01R 11/289; H01R 13/03; H01R 2201/26; H01R 4/30; H01R 4/302
See application file for complete search history.

(56) References Cited

U.S. PATENT DOCUMENTS

| | | | | |
|---|---|---|---|---|
| 1,711,453 A * | 4/1929 | Carr | ...... | F16B 37/044 411/61 |
| 1,755,590 A * | 4/1930 | Carr | ...... | A44B 1/30 411/969 |
| 2,434,876 A * | 1/1948 | Warren | ...... | F16B 5/10 411/554 |
| 2,443,509 A * | 6/1948 | Lundy | ...... | H01R 24/20 439/738 |
| 2,853,112 A * | 9/1958 | Ougljesa | ...... | F16B 5/0208 411/105 |
| 2,858,156 A * | 10/1958 | Wootton | ...... | F16B 43/001 384/138 |
| 2,972,367 A * | 2/1961 | Wootton | ...... | F16B 5/0208 411/965 |
| 3,019,501 A * | 2/1962 | Kraus | ...... | F16B 5/0208 24/684 |

(Continued)

*Primary Examiner* — Thanh Tam T Le
(74) *Attorney, Agent, or Firm* — Polsinelli PC

(57) ABSTRACT

The subject disclosure relates to a water-tight sealed stud assembly for high current applications. The water-tight sealed stud assembly can include a stud, a sealing ring, a sleeve, and a body. The stud may have a stud base and a thickened portion having an annular groove. The sealing ring may be disposed in the annular groove. The sleeve may be disposed circumferentially around the stud and made of a conductive material. The body may be disposed circumferentially around the sleeve and made of a non-conductive material. Systems and methods are also provided.

18 Claims, 5 Drawing Sheets

(56) References Cited

U.S. PATENT DOCUMENTS

| | | | | |
|---|---|---|---|---|
| 3,060,786 | A * | 10/1962 | Flower | F16B 5/0208 |
| | | | | 411/432 |
| 3,062,253 | A * | 11/1962 | Miliheiser | F16B 5/0208 |
| | | | | 411/353 |
| 3,221,589 | A * | 12/1965 | Sande | F16B 5/0208 |
| | | | | 411/979 |
| 3,960,427 | A * | 6/1976 | Piaget | H01R 4/70 |
| | | | | 439/892 |
| 4,126,367 | A * | 11/1978 | Miller | H01R 11/03 |
| | | | | 439/522 |
| 5,147,219 | A * | 9/1992 | Gilberts | H01R 4/30 |
| | | | | 174/138 F |
| 6,250,975 | B1 * | 6/2001 | LaPointe | H01R 4/64 |
| | | | | 439/883 |
| 6,491,551 | B1 * | 12/2002 | Julian | H01R 13/746 |
| | | | | 439/737 |
| 6,864,015 | B2 * | 3/2005 | Peterson | H01R 11/12 |
| | | | | 429/182 |
| 7,056,161 | B2 * | 6/2006 | Delcourt | H01R 4/30 |
| | | | | 411/181 |
| 7,083,479 | B2 * | 8/2006 | Muller | H01R 4/64 |
| | | | | 439/801 |
| 8,070,404 | B1 * | 12/2011 | Schluter | F16B 39/282 |
| | | | | 411/368 |
| 10,808,930 | B2 * | 10/2020 | Schlichting | F23R 3/60 |
| 11,211,721 | B2 * | 12/2021 | Molinero Benitez | |
| | | | | H01R 13/521 |

* cited by examiner

STUD ASSEMBLY FOR HIGH CURRENT APPLICATIONS

BACKGROUND

1. Technical Field

The subject technology provides solutions for a mechanical fastening assembly and more particularly, to a water-tight sealed fastening assembly for high current applications.

2. Introduction

Autonomous vehicles have many electrical components that require high currents and are susceptible to water damage. Since these components are essential to the functions of autonomous vehicles, potential ingress points to these electrical components create a need for a water-tight sealed fastening assembly for high current applications.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Due to heavy reliance of autonomous vehicles on electrical systems and components, the electrical systems and components must be prioritized for protection and reliability. Many of these electrical systems may require receiving high current power through a vehicle harness from a large battery or power supply. For example, some electrical systems may require up to 320 amperes per contact. As additional parts are used to send power, additional resistance is created, which reduces the overall current to the electrical systems and generates excess heat. Furthermore, in some scenarios, the electrical system may be a power distribution board (PDB), which distributes power to various components, such as compute and ethernet switches. Thus, current is further reduced to the various components through the PDB.

Furthermore, these electrical systems and components are sensitive to damage from liquids, such as water. As additional parts are used in fastening various parts together, more ingress points for liquids are created, which increases the potential for damage of the electrical systems from liquids. Thus, aspects of the disclosed technology address the foregoing limitations by providing solutions for a water-tight sealed fastener assembly capable of transferring high currents.

In some aspects, a water-tight sealed stud assembly for high current applications comprises a stud, a sleeve disposed circumferentially around the stud, and a body disposed circumferentially around the sleeve. The stud may comprise a stud base and a thickened portion. The thickened portion may comprise an annular groove, in which a sealing ring may be disposed. The sleeve may be comprised of a conductive material, while the body may be comprised of a non-conductive material.

Figure 1:
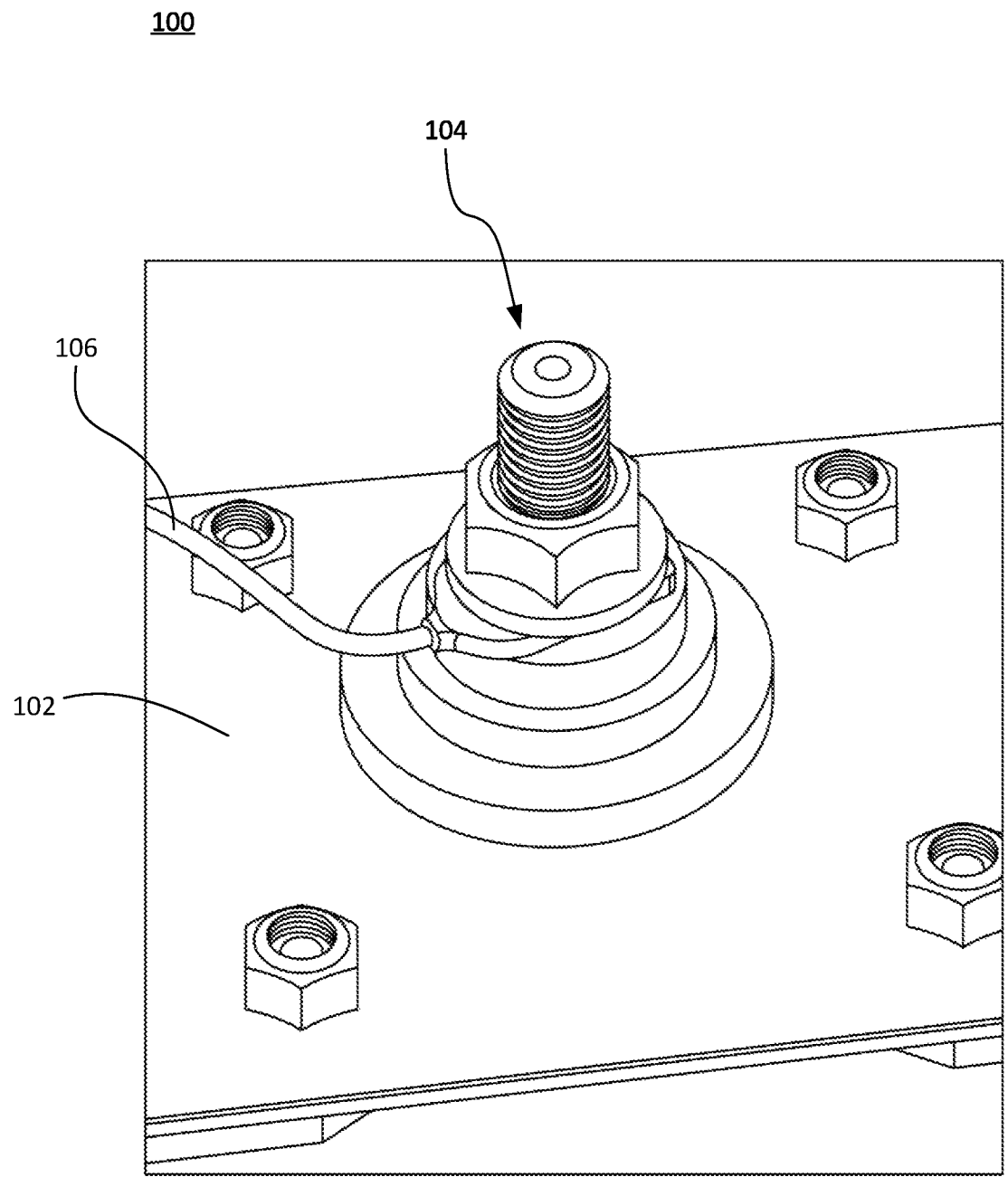
FIG. 1 illustrates an example environment having a water-tight sealed fastening assembly fastening a board, according to some aspects of the present technology.

FIG. 1 illustrates an example system 100 having a board 102 and a fastening assembly 104. Board 102 may be a printed circuit board (PCB) or a power distribution board (PDB), which connects and provides power to various computing components. Board 102 and various computing components may be electrically connected using conductive tracks, such that board 102 and various computing components require protection from water.

Fastening assembly 104 may, as will be discussed further below, contain a stud, a screw, a bolt, etc. Fastening assembly 104 fastens to board 102, while also providing electrical currents through the fastening assembly 104. Furthermore, fastening assembly 104 prevents water from interacting with board 102 by providing a water-tight seal, such that water is unable to enter therethrough. In other words, fastening assembly 104 seals a would-be liquid ingress point. Fastening assembly 104 receives a power cable 106, which relays power and/or electrical currents therethrough. The power cable 106 may be attached to a battery or any other power provider.

Figure 2:
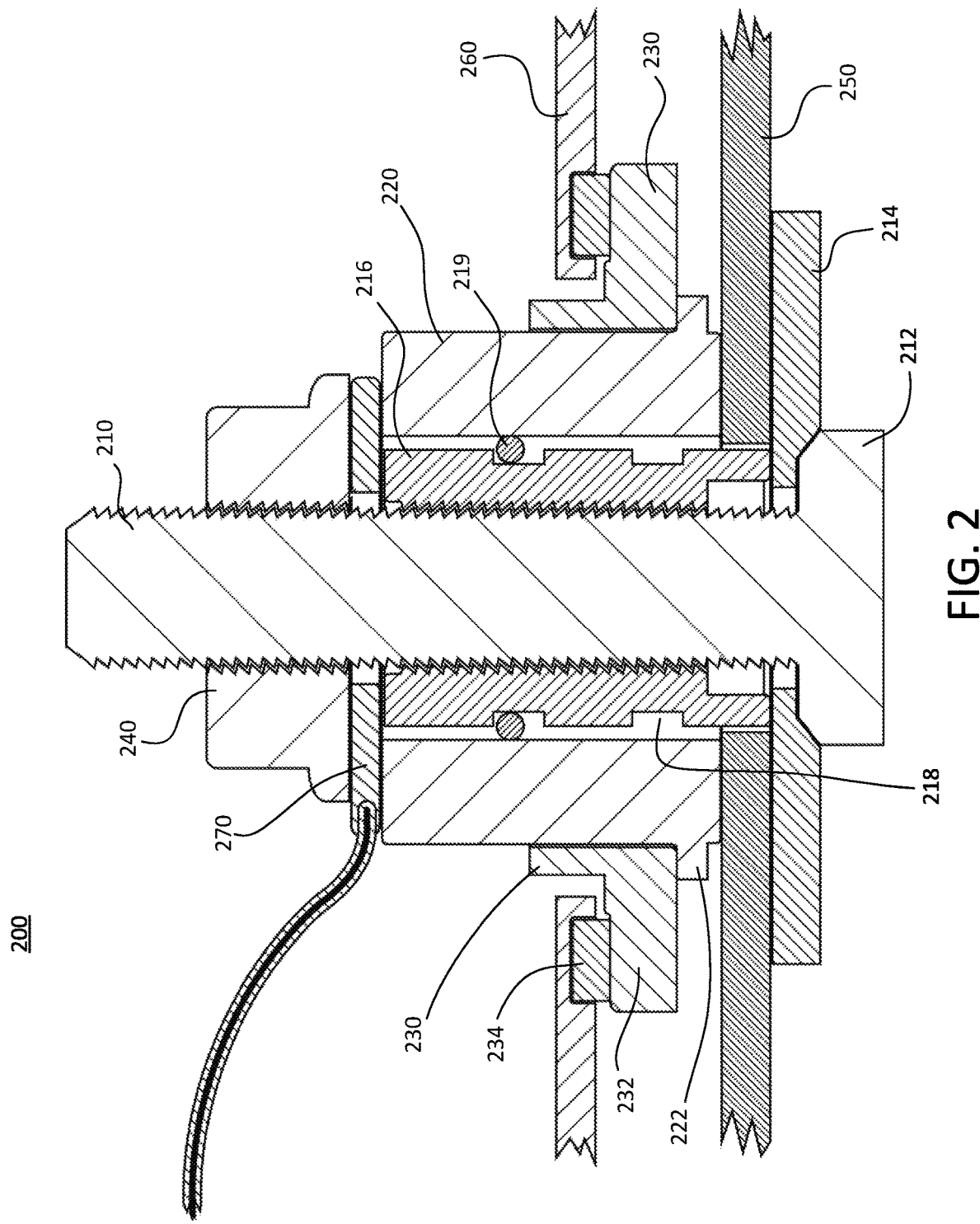
FIG. 2 illustrates a cross-sectional view of the fastening assembly, according to some aspects of the present technology.

FIG. 2 illustrates an example fastening assembly 200. Fastening assembly 200 includes a stud 210, a sleeve 220, a body 230, and a cap 240. Furthermore, fastening assembly 200 is configured to receive a board 250, a cover plate 260, and a power cable 270.

The stud 210 may have a stud base 212, a stud mount 214, a thickened portion 216, and an annular groove 218. It is further contemplated that other fasteners may be used in place of stud 210, such as screws, bolts, rods, etc.

The stud base 212 may be a nut threaded onto the stud 210. Stud base 212 provides a base, against which stud mount 214 may be connected. Furthermore, stud base 212 provides securement of stud mount 214 and other parts attached thereto against the stud 210. It is further contemplated that other fasteners, such as bolts, may have a base attached thereto, such that the base need not be threaded onto stud 210.

Stud mount 214 may be placed over stud base 212 to provide more surface area to spread torque resistance. In some embodiments, stud mount 214 is circular to spread pressure equally around the surface area.

Thickened portion 216 provides a reinforced area for stud 210. Thickened portion 216 may be formed integrally or may be a jacket threaded onto stud 210. Furthermore, thickened portion 216 provides an area to attach sleeve 220, without contacting a larger surface area of stud 210.

On thickened portion 216, there may be an annular groove 218. Annular groove 218 is configured to receive and secure an inner sealing ring 219. More specifically, annular groove 218 receives inner sealing ring 219 and, when sleeve 220 is disposed therearound, secures inner sealing ring 219, such that liquid is captured outside of inner sealing ring 219. Inner sealing ring 219 may be made of a wide variety of different materials, including, but not limited to, silicone, neoprene, rubber, etc. It is further contemplated that thickened portion 216 may utilize an insert, such as a Heli-coil® insert, to create annular groove 218 and provide reinforcement to stud 210. In some embodiments, the thickened portion 216 may have multiple annular grooves 218 to receive and secure multiple inner sealing rings 219 to provide additional redundancies for sealing. When annular groove 218 and inner sealing ring 219 are disposed at an upper end of thickened portion 216, the resulting seal provides an early point of sealing. When annular groove 218 and inner sealing ring 219 are disposed at a lower end of thickened portion 216, the resulting seal provides additional angular flexibility between stud 210 and board 250.

Sleeve 220 is disposed circumferentially around thickened portion 216. Thus, sleeve 220 is disposed circumferentially around inner sealing ring 219 to develop a water-tight seal. In some embodiments, sleeve 220 is press fit around thickened portion 216, such that the resulting mechanical interference between thickened portion 216, inner sealing ring 219, and sleeve 220 form the water-tight seal. Sleeve 220 is made of a conductive material to allow electrical currents to pass therethrough. In some embodiments, the conductive material may be copper. Similarly, in some embodiments, the conductive material may be a nickel-plated copper. Furthermore, a distance between sleeve 220 and stud base 212 receives and secures board 250. When board 250 is in communication with sleeve 220 and sleeve 220 is in communication with a power supply or power cable 270, board 250 receives a current through sleeve 220. Accordingly, an upper end of sleeve 220 is configured to receive a harness from power cable 270. In other words, sleeve 220 is configured to receive the harness adjacent to an upper end of stud 210.

Body 230 is disposed circumferentially around sleeve 220. Body 230 provides insulation to sleeve 220 and prevents undesired contact between other components and sleeve 220. Thus, body 230 may be comprised of a non-conductive material. In some embodiments, the non-conductive material is plastic. It is further contemplated that, in some embodiments, sleeve 220 may have an annular shoulder 222, on which body 230 is disposed.

Body 230 may also have an annular attachment shoulder 232, in which an annular ring 234 may be disposed. Annular attachment shoulder 232 may receive cover plate 260. Annular ring 234 provides additional dampening between body 230 and cover plate 260, such that vibrations from cover plate 260 is dampened to body 230 and any other parts inwards (e.g. sleeve 220, stud 210, board 250, etc.). Furthermore, annular ring 234 may be an outer sealing ring to further provide an additional water-tight seal between body 230 and cover plate 260. In some embodiments, the outer sealing ring may be overmolded circumferentially around the body. Thus, it is further contemplated that annular ring 234 need not be disposed in annular attachment shoulder 232.

Cap 240 secures to an upper portion of stud 210. More specifically, cap 240 is configured to thread onto a threaded portion of stud 210. Thus, in some embodiments, cap 240 may be a nut or a sealing nut. Accordingly, stud 210 is configured to threadedly receive cap 240. It is to be understood, however, that cap 240 may also be fit onto stud 210 by other methods including, but not limited to, press-fit, overmolding, clamping, etc. Cap 240 may also secure an end of power cable 270 against sleeve 220 and the upper portion of circumferentially stud 210. As cap 240 is secured onto the upper portion of stud 210, cap 240 provides downwards pressure onto the end of power cable 270 against sleeve 220, such that the end of power cable 270 communicates directly with and is secured against sleeve 220. Furthermore, the downwards pressure from cap 240 may further reinforce the mechanical interference between thickened portion 216, inner sealing ring 219, and stud 210 by reducing vertical flexibility therebetween. Similarly, when cap 240 is secured onto stud 210, the distance between sleeve 220 and stud base 212 is reduced to secure the board 250.

As discussed above, board 250 may be a printed circuit board (PCB) or a power distribution board (PDB), which connects and provides power to various computing components. Board 250 and various computing components may be electrically connected using conductive tracks, such that board 250 and various computing components require protection from water. For example, an automated driving system computer may have one or more processors may be attached to board 250. The one or more processors may be sensitive to damage from liquids; thus, the one or more processors requires protection from water. Board 250 may have conductive tracks in contact with sleeve 220, such that electrical currents may flow between board 250 and sleeve 220. Furthermore, board 250 may be disposed in a housing having various ingress points, through which liquids may, without water-tight sealed fastening assembly 200, enter the housing.

Cover plate 260 may cover and protect board 250 from physical damage. More specifically, cover plate 260 acts as a physical barrier for board 250. As discussed above, cover plate 260 may attach to body 230 and, in some embodiments, annular ring 234. In some embodiments, cover plate 260 may be a portion of the housing.

Power cable 270 provides electrical currents therethrough. Furthermore, power cable 270 may have attachments, such as an end harness. As discussed above, an end of power cable 270 may communicate with sleeve 220 to allow electrical currents to flow therebetween.

Figure 3:
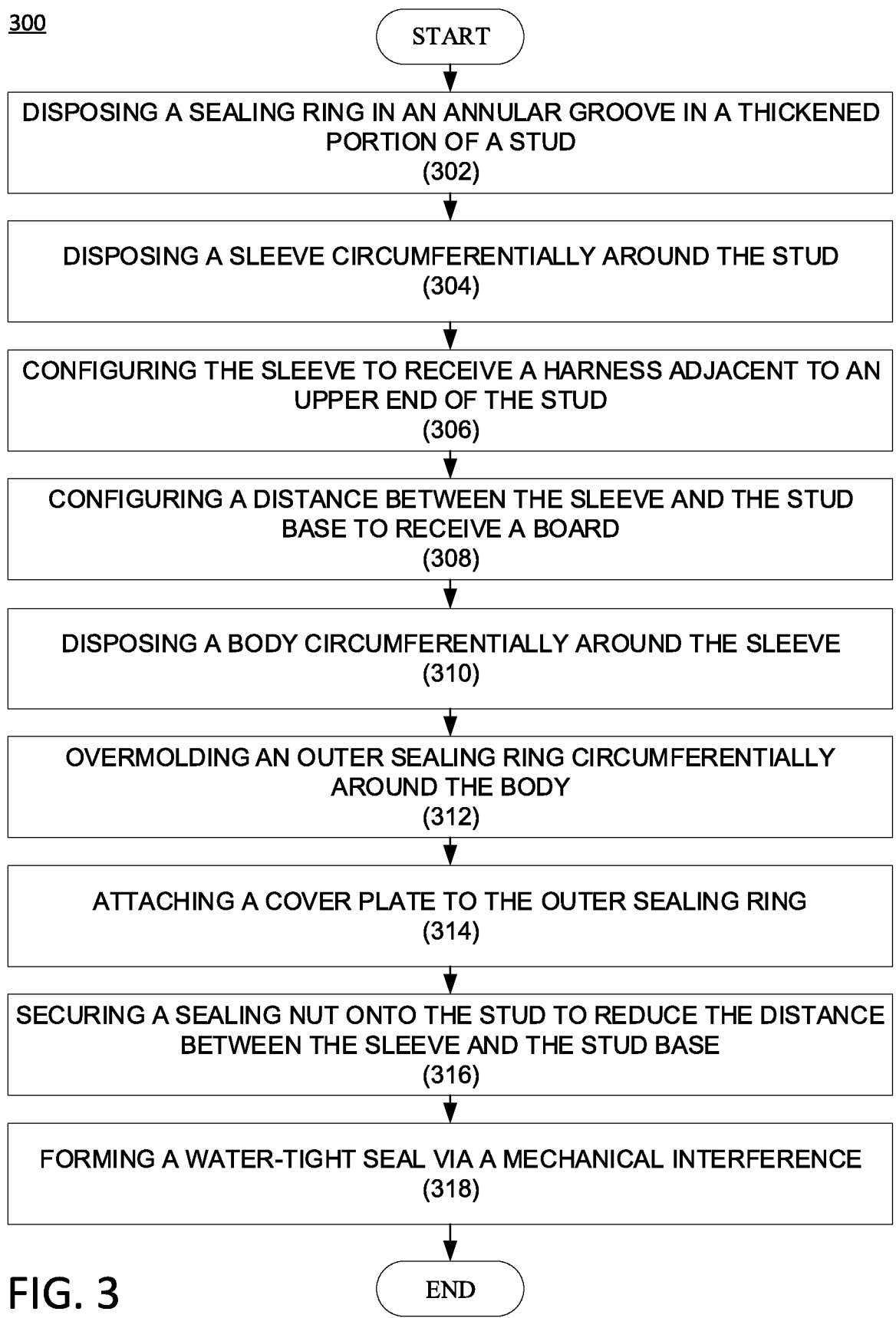
FIG. 3 illustrates an example schematic method diagram for creating a fastening assembly, according to some aspects of the disclosed technology.

FIG. 3 illustrates an example method 300 for manufacturing fastener assembly 200. Method 300 begins with step 302, in which a sealing ring is disposed in an annular groove in a thickened portion of a stud.

In step 304, a sleeve is disposed circumferentially around the stud. More specifically, a sleeve is disposed circumferentially around the thickened portion of the stud, such that the sealing ring is friction-fit between the thickened portion and the sleeve.

In step 306, the sleeve is configured and/or positioned to receive a harness adjacent to an upper end of the stud. The harness may be in direct communication with the sleeve, such that electrical currents may pass therebetween.

In step 308, the sleeve is further configured such that a distance between the sleeve and the stud base is configured to receive a board. Thus, a board may be received between the sleeve and the stud base and secured when the distance is reduced.

In step 310, a body is disposed circumferentially around the sleeve. In some embodiments, the body may be friction-fit around the sleeve. It is to be understood, however, that the body may be disposed circumferentially around the sleeve in many other various methods including, but not limited to, overmolding, co-molding, etc.

In step 312, an outer sealing ring is overmolded circumferentially around the body. It is to be understood, however, that the outer sealing ring may be disposed circumferentially around the body in many other various methods including, but not limited to, co-molding, friction-fit, etc.

In step 314, a cover plate is attached to the outer sealing ring. The cover plate may be attached through various methods including, but not limited to, adhesives, overmolding, co-molding, etc.

In step 316, a sealing nut or cap is threadedly secured onto the stud to reduce the distance between the sleeve and the stud base. As discussed above, the cap may be secured onto the stud in various other methods including, but not limited to, friction-fit, overmolding, clamping, etc.

In step 318, a water-tight seal is formed via a mechanical interference, such as a friction-fit, between the thickened portion, the inner sealing ring, and the sleeve.

Figure 4:
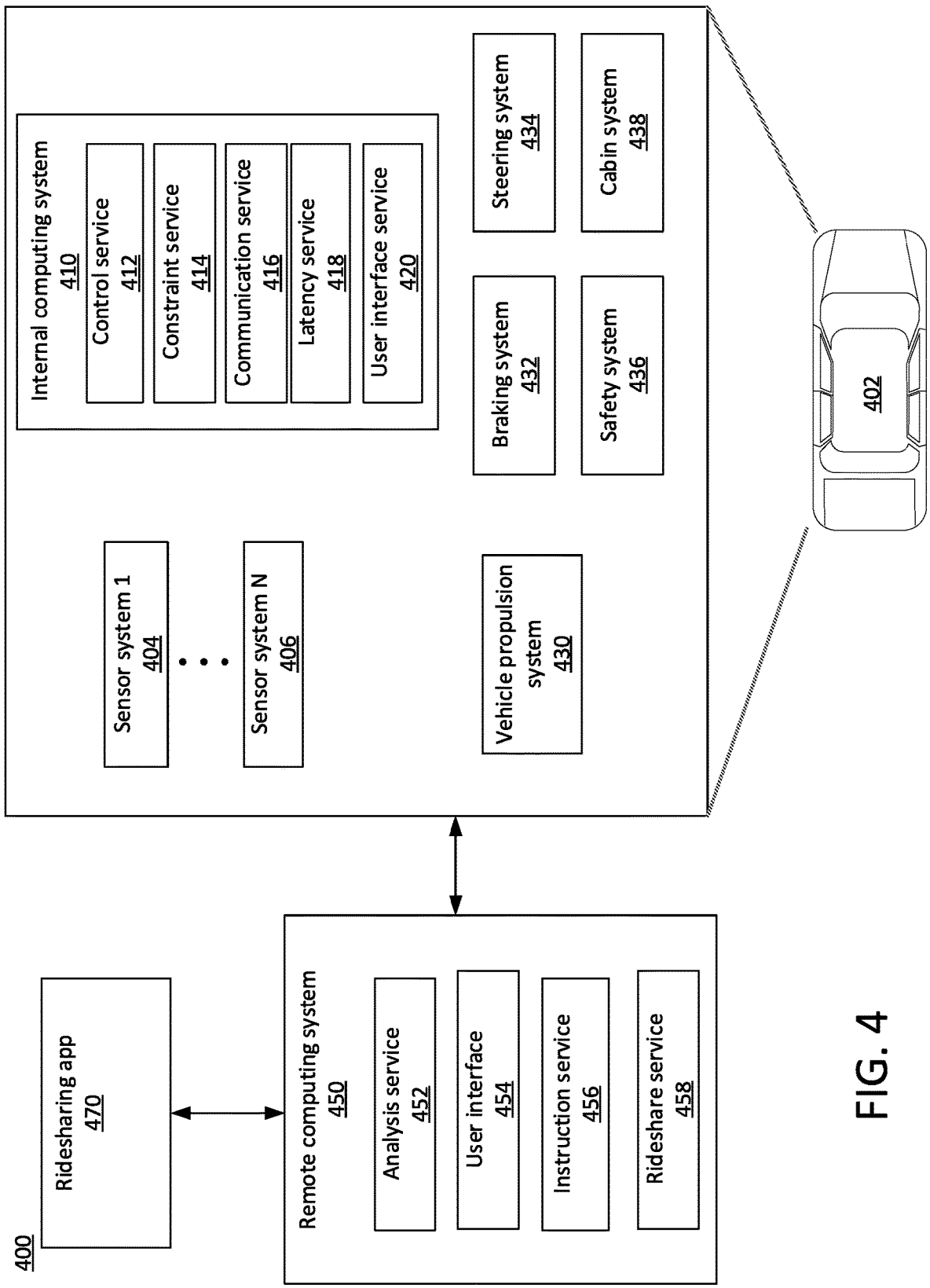
FIG. 4 illustrates an example environment that includes an autonomous vehicle in communication with a remote computing system, according to some aspects of the disclosed technology.

FIG. 4 illustrates environment 400 that includes an autonomous vehicle 402 in communication with a remote computing system 450. The autonomous vehicle 402 has various systems that may be sensitive to water and may require high currents or electrical power for operation.

The autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system, and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the systems 430, 432, 434, 436, and 438. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control the operation of the vehicle propulsion system 430, the braking system 432, the steering system 434, the safety system 436, and the cabin system 438. The control service 412 receives sensor signals from the sensor systems 404-406 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system 450, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remote computing system 450 or a human operator via the remote computing system 450, software service updates, rideshare pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402.

The remote computing system 450 can also include a rideshare service 458 configured to interact with ridesharing application 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle 402 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 5:
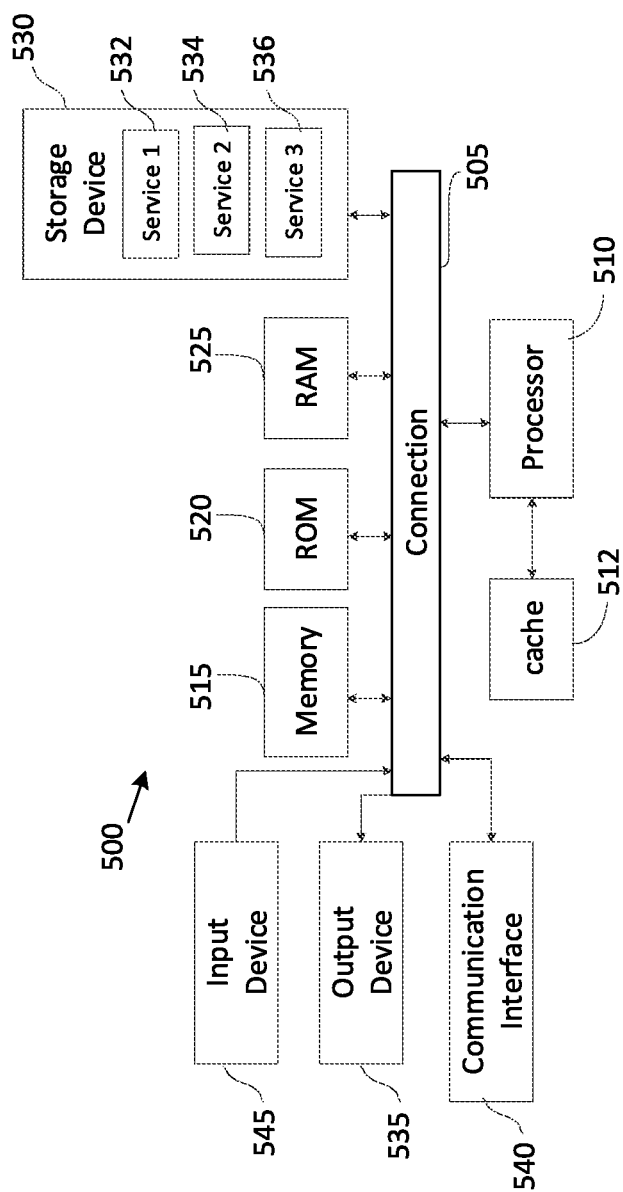
FIG. 5 illustrates an example processor-based system with which some aspects of the subject technology can be implemented.

FIG. 5 shows an example of computing system 500, which can be for example any computing device making up internal computing system 410, remote computing system 450, (potential) passenger device executing rideshare app 470, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A water-tight sealed stud assembly for high current applications comprising:
   a stud comprising a stud base and a thickened portion, the thickened portion having an annular groove;
   a sealing ring disposed in the annular groove;
   a sleeve disposed circumferentially around the stud, wherein the sleeve is comprised of a conductive material;
   a body disposed circumferentially around the sleeve, wherein the body is comprised of a non-conductive material; and
   an outer sealing ring is overmolded circumferentially around the body.

2. The water-tight sealed stud assembly of claim 1, wherein mechanical interference between the thickened portion of the stud, the sealing ring disposed in the annular groove, and the sleeve form a water-tight seal.

3. The water-tight sealed stud assembly of claim 1, wherein the sleeve is configured to receive a harness adjacent to an upper end of the stud.

4. The water-tight sealed stud assembly of claim 1, wherein the conductive material is copper.

5. The water-tight sealed stud assembly of claim 1, wherein a distance between the sleeve and the stud base is configured to receive a board, wherein the board receives a current through the sleeve.

6. The water-tight sealed stud assembly of claim 1, wherein a distance between the sleeve and the stud base is configured to receive a board, wherein the stud is configured to threadedly receive a sealing nut, and wherein, when the sealing nut is threaded onto the stud, the distance between the sleeve and the stud is reduced to secure the board.

7. The water-tight sealed stud assembly of claim 1, further comprising:
   a cover plate attached to the outer sealing ring disposed circumferentially around the body.

8. An automated driving system computer comprising:
   one or more processors attached to a board disposed in a housing;
   a stud comprising a stud base and a thickened portion, the thickened portion having an annular groove, the stud disposed in the housing;
   a sealing ring disposed in the annular groove;
   a sleeve disposed circumferentially around the stud and in the housing, wherein the sleeve is comprised of a conductive material;
   a body disposed circumferentially around the sleeve and in the housing, wherein the body is comprised of a non-conductive material;
   an outer sealing ring disposed circumferentially around the body, and
   a cover plate attached to the outer sealing ring disposed circumferentially around the body
   wherein the stud base attaches to the board.

9. The automated driving system computer of claim 8, wherein mechanical interference between the thickened portion of the stud, the sealing ring disposed in the annular groove, and the sleeve form a water-tight seal.

10. The automated driving system computer of claim 8, wherein the sleeve is configured to receive a harness adjacent to an upper end of the stud.

11. The automated driving system computer of claim 8, wherein the conductive material is copper.

12. The automated driving system computer of claim 8, wherein a distance between the sleeve and the stud base is configured to receive a board, wherein the board receives a current through the sleeve.

13. The automated driving system computer of claim 8, wherein a distance between the sleeve and the stud base is configured to receive a board, wherein the stud is configured to threadedly receive a sealing nut, and wherein, when the sealing nut is threaded onto the stud, the distance between the sleeve and the stud is reduced to secure the board.

14. The automated driving system computer of claim 8, wherein the outer sealing ring is overmolded circumferentially around the body.

15. A method comprising:
disposing a sealing ring in an annular groove in a thickened portion of a stud;
disposing a sleeve circumferentially around the stud, wherein the sleeve is comprised of a conductive material;
disposing a body circumferentially around the sleeve, wherein the body is comprised of a non-conductive material; and
disposing an outer sealing ring overmolded circumferentially around the body.

16. The method of claim 15, further comprising:
forming a water-tight seal via a mechanical interference between the thickened portion of the stud, the sealing ring disposed in the annular groove, and the sleeve.

17. The method of claim 15, further comprising:
configuring the sleeve to receive a harness adjacent to an upper end of the stud.

18. The method of claim 15, wherein the conductive material is copper.

* * * * *